US009763028B2

(12) United States Patent
O'Donoghue

(10) Patent No.: US 9,763,028 B2
(45) Date of Patent: Sep. 12, 2017

(54) SYSTEMS AND METHODS FOR WIRELESS COMMUNICATION INTEROPERABILITY

(71) Applicant: QUALCOMM Incorporated, San Diego, CA (US)

(72) Inventor: Jeremy Robin Christopher O'Donoghue, Wokingham (GB)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/678,795

(22) Filed: Apr. 3, 2015

(65) Prior Publication Data
US 2016/0295351 A1 Oct. 6, 2016

(51) Int. Cl.
*H04B 5/00* (2006.01)
*H04W 4/00* (2009.01)
*H04W 12/04* (2009.01)
*H04W 36/00* (2009.01)
*H04W 36/14* (2009.01)
*H04L 29/08* (2006.01)
*H04W 88/06* (2009.01)
*H04W 84/18* (2009.01)
*H04W 8/00* (2009.01)

(52) U.S. Cl.
CPC .......... *H04W 4/008* (2013.01); *H04L 67/104* (2013.01); *H04W 12/04* (2013.01); *H04W 36/0066* (2013.01); *H04W 36/14* (2013.01); *H04W 8/005* (2013.01); *H04W 84/18* (2013.01); *H04W 88/06* (2013.01)

(58) Field of Classification Search
CPC ......... H04B 5/00; H04W 4/008; H04W 88/06

USPC .............................................. 455/41.1, 41.2
See application file for complete search history.

(56) References Cited

U.S. PATENT DOCUMENTS

| 7,174,004 | B1 * | 2/2007 | Michaelis ......... H04M 3/42391 379/52 |
| 7,948,925 | B2 | 5/2011 | Miyabayashi et al. |
| 8,674,808 | B2 | 3/2014 | Jantunen et al. |
| 8,818,276 | B2 | 8/2014 | Kiukkonen et al. |
| 8,838,027 | B2 | 9/2014 | Waters |
| 2009/0227282 | A1 * | 9/2009 | Miyabayashi ...... H04L 63/0492 455/552.1 |
| 2010/0330904 | A1 * | 12/2010 | Stougaard ............... H04L 67/12 455/41.1 |
| 2012/0252429 | A1 * | 10/2012 | Yoshizawa ............ H04W 24/02 455/418 |
| 2013/0178163 | A1 | 7/2013 | Wang |

(Continued)

FOREIGN PATENT DOCUMENTS

WO 2012166977 A2 12/2012

OTHER PUBLICATIONS

International Search Report and Written Opinion—PCT/US2016/020703—ISA/EPO—Jun. 7, 2016.

*Primary Examiner* — Ayodeji Ayotunde
(74) *Attorney, Agent, or Firm* — Austin Rapp & Hardman, P.C.

(57) ABSTRACT

A method for wireless communication is described. The method includes receiving a signal from a short-range transmit device using a first communication technology. The signal indicates proximity and characteristics of a remote device that uses a second communications technology. The method also includes configuring a controller according to the signal for communications with the remote device using the second communications technology.

26 Claims, 8 Drawing Sheets

(56) References Cited

U.S. PATENT DOCUMENTS

2014/0213185 A1\* 7/2014 Arponen .............. H04B 5/0031
　　　　　　　　　　　　　　　　　　　　　455/41.1
2014/0273838 A1　9/2014 Naniyat et al.

\* cited by examiner

SYSTEMS AND METHODS FOR WIRELESS COMMUNICATION INTEROPERABILITY

TECHNICAL FIELD

The present disclosure relates generally to electronic devices. More specifically, the present disclosure relates to systems and methods for wireless communication interoperability.

BACKGROUND

The use of wireless communication devices has become common. In particular, advances in electronic technology have reduced the cost of increasingly complex and useful wireless communication devices. Cost reduction and consumer demand have proliferated the use of wireless communication devices such that they are practically ubiquitous in modern society. As the use of wireless communication devices has expanded, so has the demand for new and improved features of wireless communication devices. More specifically, wireless communication devices that perform new functions and/or that perform functions faster, more efficiently or with higher quality are often sought after.

Some wireless communication devices (e.g., smartphones) transmit wireless signals. For example, the wireless signals may be utilized to communicate with other wireless communication devices. For instance, the wireless signals may convey voice information or data. In some implementations, the wireless communication may be over an inductive coupling between devices.

The use of some wireless technology is currently limited. In some circumstances, a wireless communication device may not be able to use default configurations to communicate with a remote device. If the wireless communication device is reconfigured, the wireless communication device may be able to communicate with the remote device. However, reconfiguring the wireless communication device may be too complex for a user of the wireless communication device to perform. As can be observed from this discussion, systems and methods for enhancing wireless communication interoperability may be beneficial.

SUMMARY

A method for wireless communication is described. The method includes receiving a signal from a short-range transmit device using a first communication technology. The signal indicates proximity and characteristics of a remote device that uses a second communications technology. The method also includes configuring a controller according to the signal for communications with the remote device using the second communications technology.

The first communication technology may have a longer range than the second communications technology. The signal may include an identifier that identifies the characteristics of the second communications technology used by the remote device. The short-range transmit device may be a Bluetooth low energy beacon and the remote device may be a remote near-field communication (NFC) device.

Configuring the controller may include determining, based on the signal, that a first configuration used by the controller for the second communications technology is incompatible with the remote device. A second configuration for the controller that is interoperable with the remote device may be determined based on the signal. The second configuration may be applied to the controller.

Determining a second configuration for the controller that is interoperable with the remote device may include determining configuration information for the second communication technology based on the signal. The controller may be reconfigured with the first configuration upon leaving a transmission range of the short-range transmit device. Configuring the controller may include changing one or more radio frequency (RF) parameters of the controller.

A Bluetooth low energy controller may provide the signal to a device host. The device host may configure the controller according to the signal. The Bluetooth low energy controller may be directly connected to the controller via a single wire protocol (SWP) interface. Configuring the controller for communications with the remote device may occur without powering up the device host.

The remote device may be a NFC reader used in a mass transit system to implement ticketing transactions. The second configuration that is interoperable with the NFC reader may be applied to the controller in lieu of the first configuration.

A wireless communication device is also described. The wireless communication device includes a processor, memory in electronic communication with the processor, and instructions stored in the memory. The instructions are executable by the processor to receive a signal from a short-range transmit device using a first communication technology. The signal indicates proximity and characteristics of a remote device that uses a second communications technology. The instructions are also executable by the processor to configure a controller according to the signal for communications with the remote device using the second communications technology.

A computer-program product for wireless communication is also described. The computer-program product includes a non-transitory tangible computer-readable medium having instructions thereon. The instructions include code for causing a wireless communication device to receive a signal from a short-range transmit device using a first communication technology. The signal indicates proximity and characteristics of a remote device that uses a second communications technology. The instructions also include code for causing the wireless communication device to configure a controller according to the signal for communications with the remote device using the second communications technology.

An apparatus for wireless communication is also described. The apparatus includes means for receiving a signal from a short-range transmit device using a first communication technology. The signal indicates proximity and characteristics of a remote device that uses a second communications technology. The apparatus also includes means for configuring a controller according to the signal for communications with the remote device using the second communications technology.

DETAILED DESCRIPTION

The detailed description set forth below in connection with the appended drawings is intended as a description of exemplary implementations of the disclosure and is not intended to represent the only implementations in which the disclosure may be practiced. The term "exemplary" used throughout this description means "serving as an example, instance, or illustration," and should not necessarily be construed as preferred or advantageous over other exemplary implementations. The detailed description includes specific details for the purpose of providing a thorough understanding of the exemplary implementations of the disclosure. In some instances, some devices are shown in block diagram form.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

Figure 1:
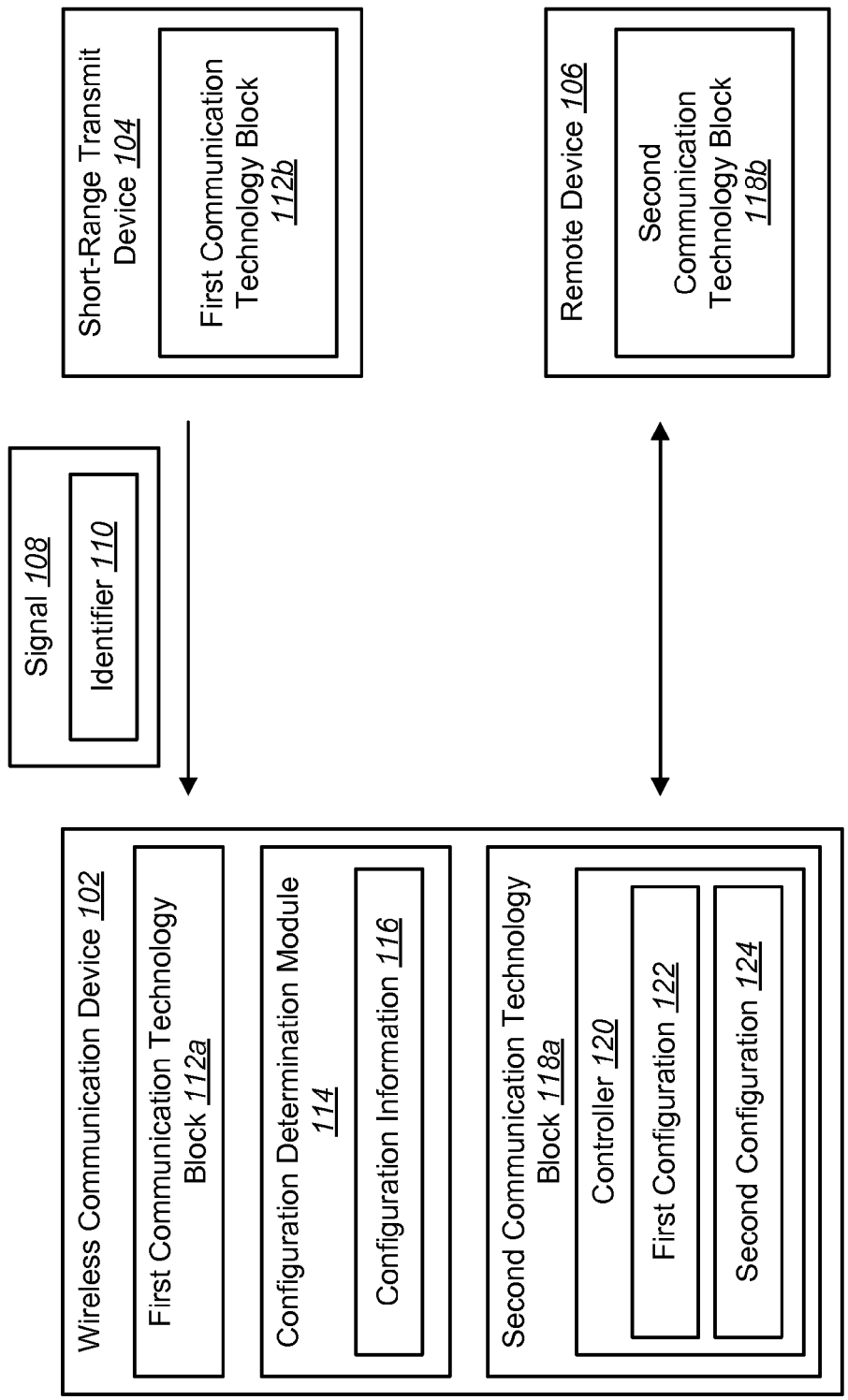
FIG. 1 is a block diagram illustrating one configuration of a wireless communication device in which systems and methods for wireless communication interoperability may be implemented.

FIG. 1 is a block diagram illustrating one configuration of a wireless communication device 102 in which systems and methods for wireless communication interoperability may be implemented. Examples of the wireless communication device 102 include cellular phones, smartphones, tablet devices, voice recorders, digital cameras, still cameras, camcorders, gaming systems, laptop computers, etc.

The wireless communication device 102 may include a first communication technology bock 112a and a second communication technology block 118a. The first communication technology bock 112a may be configured to communicate with devices using a first communication technology. The second communication technology block 118a may be configured to communicate with devices using a second communication technology.

The wireless communication device 102 may use the second communication technology to communicate with a remote device 106. The remote device 106 may include a second communication technology block 118b that is configured to communicate with devices using the second communication technology. The wireless communication device 102 may include a controller 120 that implements communication with the remote device 106 using the second communication technology.

The controller 120 may be implemented in hardware or a combination of hardware and software. Examples of the controller 120 include electronic circuitry, application-specific integrated circuits (ASICs), processors and memory that store executable instructions (that may be separate from a processor/memory utilized for a device host, for example), etc.

The controller 120 may be configured with a first configuration 122. The first configuration 122 may be a set of parameters that facilitate communications using the second communication technology. For example, the first configuration 122 may be a default set of radio frequency (RF) parameters that the controller 120 may use to establish a link with the remote device 106. As an example, certain NFC readers may be responsive only for particular values of the SAK bits, or may require the use of passive peer to peer operations.

In some configurations, the controller 120 may be included in (or may be one implementation of) an induction-based communication transceiver, which may establish radio communication with the remote device 106 using magnetic induction. The induction-based communication transceiver may include an induction-based transmitter and a receiver. One specific example of induction-based communication is near field communication (NFC). Therefore, in some configurations, the controller 120 may be an NFC controller that operates according to NFC protocols.

In the context of NFC, there are two devices communicating: an initiator and a target. The NFC standards are maintained by an organization known as the NFC Forum. The antenna of an initiator NFC device produces a radiated field (also referred to as a magnetic field or an electromagnetic field) that is received by the antenna of a target NFC device. The communication range of NFC is limited to a few centimeters.

In one exemplary configuration, the remote device 106 may be an NFC reader. In this implementation, the remote device 106 acts as the initiator NFC device and the wireless communication device 102 may act as the target NFC device. The remote device 106 (i.e., the initiator NFC device) may poll for nearby NFC devices. The wireless communication device 102 (i.e., the target NFC device) may begin to listen when it comes within a few centimeters of the initiator NFC device. For example, a user may place the wireless communication device 102 in the vicinity of the remote device 106 to initiate a payment transaction.

A wireless communication device 102 using NFC may attempt to interoperate with legacy NFC infrastructures. The NFC Forum has attempted to define a compatible subset of features for a broad range of NFC devices. An NFC device (e.g., wireless communication device 102) may be configured with a "default" configuration (e.g., first configuration 122) that uses has been found to be broadly interoperable. However, some legacy devices are not interoperable. These legacy devices may include NFC readers (e.g., the remote device 106), for example.

This is of particular concern in the transit sector where legacy NFC devices may be used. For example, the remote device 106 may be a transit NFC reader for a mass transit system. The remote device 106 may perform ticketing transactions and gate operations. Examples of transit systems that use NFC include trains, buses, subways, trams, taxis, ferries, bicycle rentals, etc.

In one example, a user may use NFC functionality of the wireless communication device 102 as an electronic ticket for contactless payment in a subway. The remote device 106 may be located on or near a subway gate. By holding the wireless communication device 102 up to the remote device 106, the transit system may perform a payment transaction for a ticket and open an entrance gate to the subway. After arriving at a destination, the user may then exit the subway by holding the wireless communication device 102 up to another remote device 106 associated with an exit gate.

In the transit sector, operators may invest in NFC transit readers that are expected to operate for many years without reconfiguration. However, as NFC standards evolve, newer configurations for the wireless communication device 102 may not be interoperable with older NFC transit readers. For example, some legacy NFC applications require a fixed unique identifier (UID), but most current NFC applications prefer a random UID. Additionally, some legacy NFC readers will not read a tag that presents an unexpected select acknowledgment (SAK) value (often a result of peer-to-peer (P2P) enablement in the wireless communication device 102, for example).

Additionally, problems of interoperability may occur due to different configurations used by different mobile network operators. For example, a mobile network operator may require that a wireless communication device 102 use a default configuration (e.g., first configuration 122) that is known to be compatible with major infrastructure systems in a particular region, even if this configuration causes problems with other systems around the world.

In almost all cases, the incompatibility of a legacy NFC device can be resolved by reconfiguring the NFC controller (e.g., controller 120) on the NFC device. As described above, a wireless communication device 102 may ship with a default first configuration 122 that is broadly interoperable. However, this first configuration 122 may fail to be interoperable with some legacy infrastructure.

In one approach to address this problem, a specific NFC configuration or reconfiguration for an NFC device may be performed by a mobile network operator. However, this network configuration may not address the configuration requirements of a specific legacy NFC device.

In another approach, vendors of wireless communication devices 102 may have a set of proprietary work-arounds that attempt to change the NFC controller (e.g., controller 120) behavior based on what the wireless communication device 102 can discover from a reader when the wireless communication device 102 enters its field. However, this approach often results in poor interoperability. Furthermore, these work-arounds are usually outside the scope of the NFC standards. However, detailed parameter configuration is far too complex to be exposed to the user.

To enhance interoperability of the wireless communication device 102 and the remote device 106, a short-range transmit device 104 may be used. The short-range transmit device 104 may include a first communication technology block 112*b* that is configured to communicate with devices using a first communication technology. The short-range transmit device 104 may be located on or near the remote device 106. The short-range transmit device 104 may be used to indicate to the wireless communication device 102 device that it is in close proximity to an NFC reader (i.e., the remote device 106).

The short-range transmit device 104 may send a signal 108 that indicates proximity and characteristics of the remote device 106. The short-range transmit device 104 may broadcast the signal 108. In one implementation, the short-range transmit device 104 may include a transmitter, but not a receiver. This may provide beneficial energy savings for the short-range transmit device 104. Upon receiving the signal 108, the wireless communication device 102 may reconfigure the controller 120 for communications with the remote device 106.

Because the short-range transmit device 104 indicates the proximity of the remote device 106, the first communication technology may have a longer range than the second communications technology. In one implementation, the first communication technology may be Bluetooth low energy. In this implementation, the short-range transmit device 104 may be a Bluetooth low energy beacon. For example, the short-range transmit device 104 may be an iBeacon-like device. Alternatively, the first communication technology may be another low-power communication protocol such as ZigBee.

Bluetooth operates in the Industrial, Scientific and Medical (ISM) 2.4 GHz short-range radio frequency band (e.g., 2400-2483.5 MHz). Bluetooth uses a radio technology called frequency-hopping spread spectrum in which transmitted data is divided into packets and each packet is transmitted on a designated Bluetooth frequency (e.g., channel). Bluetooth low energy has a range of several meters.

It may be beneficial to limit the range that the short-range transmit device 104 broadcasts the signal 108 to within a few meters of the remote device 106. Because the short-range transmit device 104 is used to reconfigure the wireless communication device 102 to communicate with a nearby remote device 106, limiting the range of the short-range transmit device 104 will ensure that the wireless communication device 102 is reconfigured when it is likely that a transaction with the remote device 106 is about to occur. This may be accomplished by using a first communication technology that has a relatively short range (e.g., Bluetooth low energy, ZigBee). The range of the short-range transmit device 104 may be further controlled by adjusting the transmission power of the signal 108.

The signal 108 may include an identifier 110 that identifies characteristics of the second communications technology used by the remote device 106. The identifier 110 may be used to identify the remote device 106. This identifier 110 may be a unique identifier 110. In one implementation, the identifier 110 may be Bluetooth low energy universally unique identifier (UUID). The identifier 110 may be a unique value that identifies the characteristics of the remote device 106 and helps the wireless communication device 102 know how to be reconfigured.

In one implementation, the identifier 110 may include configuration information 116 that the wireless communication device 102 will apply to be interoperable with the remote device 106. In another implementation, the wireless communication device 102 may be preconfigured with the configuration information 116, which may be applied upon receiving the identifier 110 from the short-range transmit device 104. The format of the configuration information 116 as applied to the wireless communication device 102 could be standardized. This is amenable to a global solution (whether de-facto or through standards body).

In one implementation, the identifier 110 identifies the remote device 106 and provides additional configuration parameters for how to reconfigure the controller 120. For example, the identifier 110 may indicate that the remote device 106 is an NFC transit reader, the size of the antenna used by the remote device 106 and specific RF parameters that are preferred by the remote device 106. This configuration information 116 may be encoded in the identifier 110 by the short-range transmit device 104 in a manner that can be decoded by the wireless communication device 102.

In another implementation, the wireless communication device 102 may be preconfigured with a database that maps one or more identifiers 110 to one or more remote devices 106. In this implementation, the wireless communication device 102 may receive a signal 108 with an identifier 110. The wireless communication device 102 may then determine the configuration information 116 for the remote device 106 from the database.

In the case of a transit system, one set of identifiers 110 may be used to identify the remote devices 106 used in a particular transit system and another set of identifiers 110 may be used in another transit system. For example, a set of identifiers 110 may be transmitted by the transit systems in France, and another set of identifiers 110 may be transmitted by the transit systems in the United Kingdom, and so on.

The wireless communication device 102 may include a configuration determination module 114. In one implementation, the configuration determination module 114 may be included in a device host. The device host may generally perform operations on the wireless communication device 102. One example of the device host includes a processor and memory, where the processor runs an operating system (OS). Examples of operating systems that may be run by the device host include Android, iOS, Windows Phone, Windows RT and Blackberry. In another implementation, the configuration determination module 114 may be included in the controller 120.

Upon receiving the signal 108, the configuration determination module 114 may decode the identifier 110 to determine the configuration information 116 for the remote device 106. In one implementation, the configuration information 116 may be encoded in the identifier 110. In another implementation, the configuration information 116 may be stored in a database on the wireless communication device 102.

The wireless communication device 102 may configure the controller 120 for communications with the remote device 106. In one approach, the configuration determination module 114 may determine that the first configuration 122 used by the controller 120 is incompatible with the remote device 106 based on the identifier 110 included in the signal 108. The configuration determination module 114 may determine a second configuration 124 for the controller 120 that is interoperable with the remote device 106 based on the configuration information 116.

In another approach, the configuration determination module 114 may reconfigure the controller 120 with the second configuration 124 immediately upon receiving the signal 108 from the short-range transmit device 104. In this approach, the configuration determination module 114 may not determine whether the first configuration 122 is incompatible. Instead, the configuration determination module 114 immediately apply the second configuration 124 upon receiving the signal 108 from the short-range transmit device 104.

The configuration determination module 114 may apply the second configuration 124 to the controller 120. The configuration determination module 114 may configure the controller 120 by changing one or more RF parameters of the controller 120. The wireless communication device 102 may establish a communications link with the remote device 106 using the second configuration 124.

Upon leaving the transmission range of the short-range transmit device 104, the wireless communication device 102 may return to the default configuration. In other words, the wireless communication device 102 may reconfigure the controller 120 with the first configuration 122 upon leaving a transmission range of the short-range transmit device 104. Alternatively, the wireless communication device 102 may return to the first configuration 122 after a certain amount of time after applying the second configuration 124.

A benefit of the described systems and methods is that the controller 120 can be correctly configured for optimal interoperability. This configuration may occur when the user of a wireless communication device 102 is close enough to the legacy infrastructure that there is a good confidence that the user wants to use it, but before a transaction starts. This reduces transaction time and improves user experience. Furthermore, the described systems and methods provide a cost-effective way for public transit operators to make infrastructure more interoperable with more wireless communication devices 102.

Figure 2:
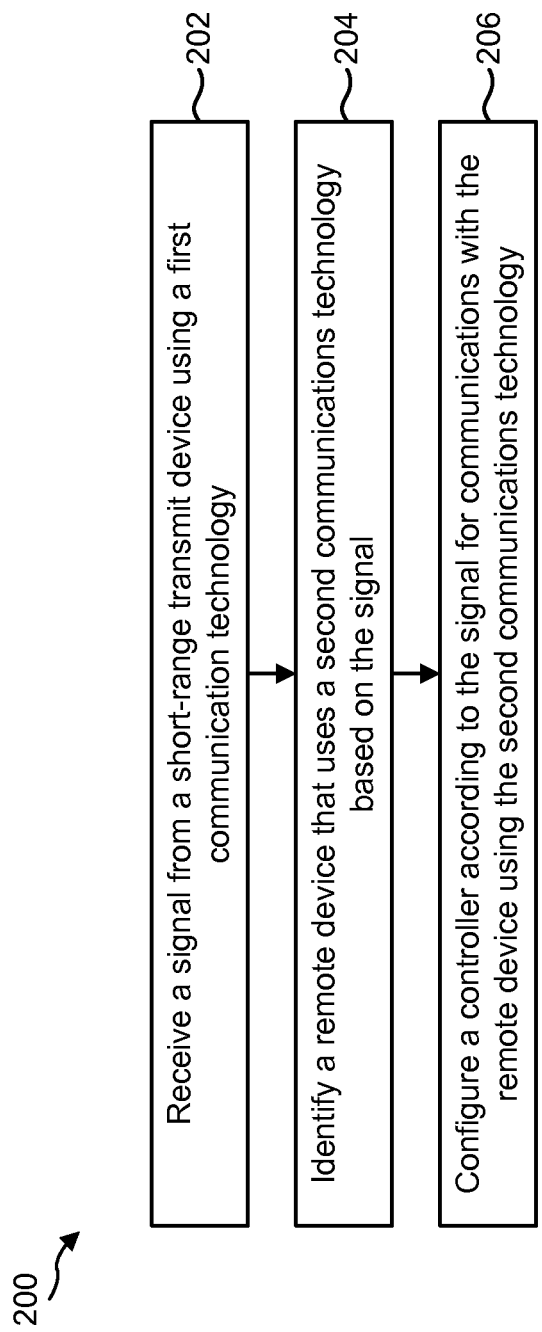
FIG. 2 is a flow diagram illustrating one configuration of a method for wireless communication interoperability.

FIG. 2 is a flow diagram illustrating one configuration of a method 200 for wireless communication interoperability. The method 200 may be implemented by a wireless communication device 102. The wireless communication device 102 may receive 202 a signal 108 from a short-range transmit device 104 using a first communication technology. The short-range transmit device 104 may broadcast the signal 108.

In one implementation, the first communication technology may be Bluetooth low energy. In this implementation, the short-range transmit device 104 may be a Bluetooth low energy beacon.

The short-range transmit device 104 may be located on or near a remote device 106 that uses a second communications technology. In an implementation, the second communications technology may be NFC and the remote device 106 may be a transit NFC reader used in a mass transit system to implement ticketing transactions.

The wireless communication device 102 may identify 204 the remote device 106 based on the signal 108. The signal 108 may indicate proximity and characteristics of the remote device 106. The signal 108 may include an identifier 110 that identifies characteristics of the second communications technology used by the remote device 106. The identifier 110 may be used to identify the remote device 106. This identifier 110 may be a unique identifier 110. In one implementation, the identifier 110 may be a Bluetooth low energy universally unique identifier (UUID).

The identifier 110 may identify the remote device 106 and provide additional configuration parameters for how to reconfigure the controller 120. The wireless communication device 102 may determine configuration information 116 for the second communication technology based on the signal 108. For example, the identifier 110 may indicate that the remote device 106 is a transit reader, the size of the antenna used by the remote device 106 and specific RF parameters that are preferred by the remote device 106. This configuration information 116 may be encoded in the identifier 110 by the short-range transmit device 104 in a manner that can be decoded by the wireless communication device 102.

The wireless communication device 102 may configure 206 a controller 120 according to the signal 108 for communications with the remote device 106 using the second communications technology. The wireless communication device 102 may configure the controller 120 by changing one or more RF parameters of the controller.

In one approach, upon receiving the signal 108 from the short-range transmit device 104, the wireless communication device 102 may determine that a first configuration 122 (e.g., default configuration) used by the controller 120 for the second communications technology is incompatible with the remote device 106. The wireless communication device 102 may determine a second configuration 124 for the controller 120 that is interoperable with the remote device 106 based on configuration information 116 obtained from the signal 108. The wireless communication device 102 may apply the second configuration 124 to the controller 120. The second configuration 124 may be applied to the controller 120 in lieu of a first configuration 122.

In another approach, the wireless communication device 102 may reconfigure the controller 120 with the second configuration 124 upon entering the range of the short-range transmit device 104 and receiving the signal 108. In this approach, the wireless communication device 102 may not determine whether the first configuration 122 is incompatible. Instead, the wireless communication device 102 immediately apply the second configuration 124 upon receiving the signal 108 from the short-range transmit device 104.

Figure 3:
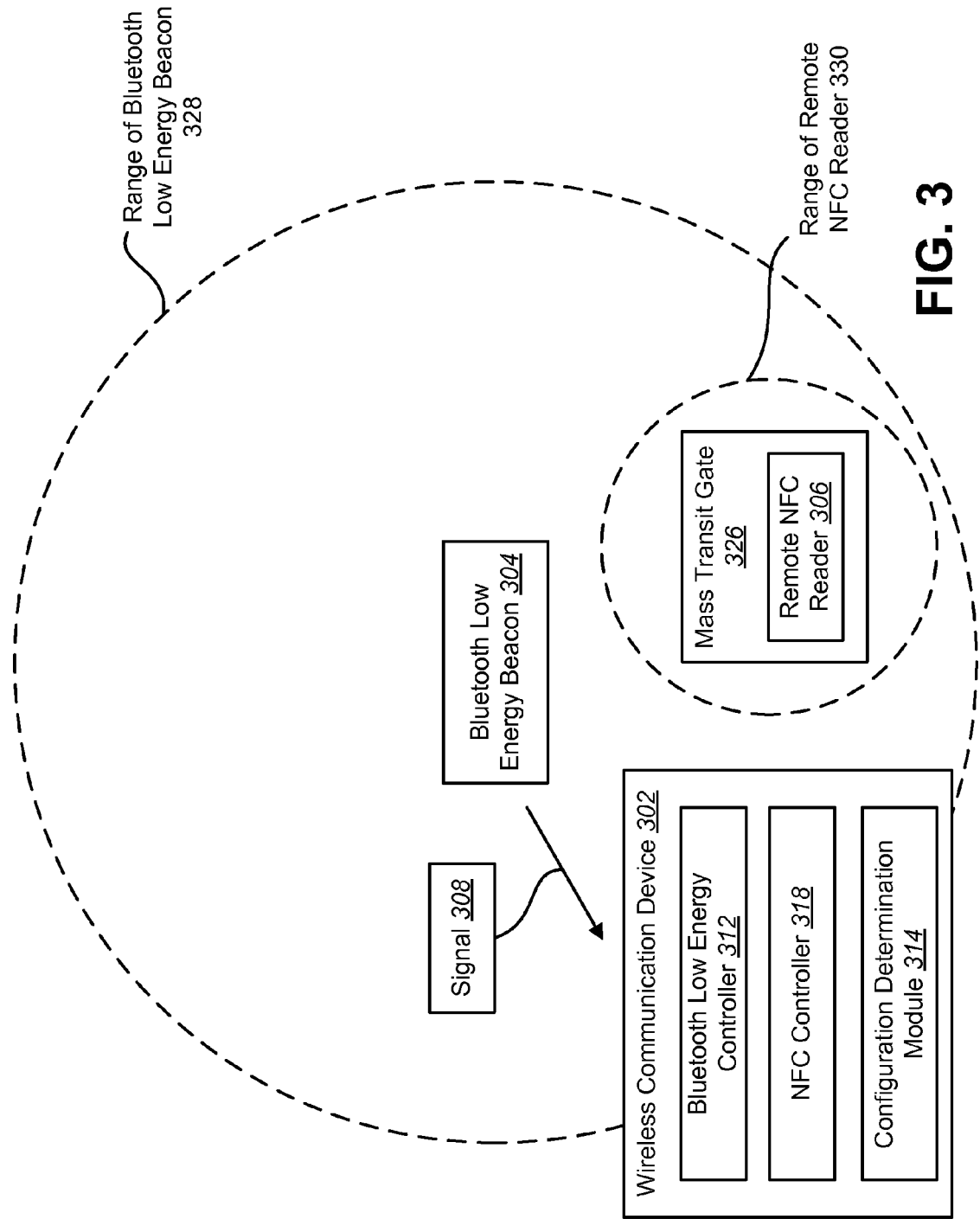
FIG. 3 is a block diagram illustrating one configuration of a wireless communication system in which enhanced wireless communication interoperability may be implemented.

FIG. 3 is a block diagram illustrating one configuration of a wireless communication system 300 in which enhanced wireless communication interoperability may be implemented. The wireless communication system 300 may include one or more of a wireless communication device 302, a Bluetooth low energy beacon 304 and a remote NFC reader 306.

The wireless communication device 302 may include a Bluetooth low energy controller 312, an NFC controller 318 and a configuration determination module 314. The Bluetooth low energy controller 312 may communicate with Bluetooth low energy devices using Bluetooth low energy protocols. The NFC controller 318 may communicate with NFC devices using NFC protocols.

The remote NFC reader 306 may be used in a transit system. For example, the remote NFC reader 306 may be located on or near a mass transit gate 326. The remote NFC reader 306 may perform ticketing operations with the wireless communication device 302 using NFC. When the wireless communication device 302 enters the range 330 of the remote NFC reader 306, the wireless communication device 302 and the remote NFC reader 306 may establish a link using NFC. The range 330 of the remote NFC reader 306 may be limited to a few centimeters.

The remote NFC reader 306 may perform ticketing operations (e.g., a payment transaction). The remote NFC reader 306 may further perform gate operations with the mass transit gate 326. For example, if valid payment is received from the wireless communication device 302, the remote NFC reader 306 may allow the mass transit gate 326 to open.

As described above, a wireless communication device 302 may not be interoperable with some legacy remote NFC readers 306. To enhance interoperability with a remote NFC reader 306, the Bluetooth low energy beacon 304 may be used. The Bluetooth low energy beacon 304 may be located near the remote NFC reader 306. The Bluetooth low energy beacon 304 may transmit a signal 308 that indicates proximity and characteristics of the remote NFC device 306. In order to configure the wireless communication device 302 for communications with the remote NFC reader 306, the range 328 of the Bluetooth low energy beacon 304 is greater than range 330 of the remote NFC reader 306.

When the wireless communication device 302 enters the range 328 of the Bluetooth low energy beacon 304, the wireless communication device 302 may receive the signal 308 broadcast by the Bluetooth low energy beacon 304. For example, the Bluetooth low energy controller 312 of the wireless communication device 302 may receive the signal 308.

A configuration determination module 314 may determine whether the NFC controller 318 is interoperable with the remote NFC reader 330. If the NFC controller 318 is not interoperable with the remote NFC reader 330, then the wireless communication device 302 may reconfigure the NFC controller 318 based on the information provided in the signal 308. This may be accomplished as described in connection with FIG. 1.

It may be beneficial to limit the range 328 of the Bluetooth low energy beacon 304 to within a few meters of the remote NFC reader 306. Because the Bluetooth low energy beacon 304 is used to reconfigure the wireless communication device 102 to communicate with a nearby remote NFC reader 306, limiting the range 328 of the Bluetooth low energy beacon 304 will ensure that the wireless communication device 102 is reconfigured when it is likely that a transaction with the remote NFC reader 306 is about to occur.

When the wireless communication device 302 enters the range 330 of the remote NFC reader 306, the NFC controller 318 of the wireless communication device 302 may establish communications with the remote NFC reader 306. Upon leaving the range 328 of the Bluetooth low energy beacon 304, the wireless communication device 302 may return to a default configuration.

Figure 4:
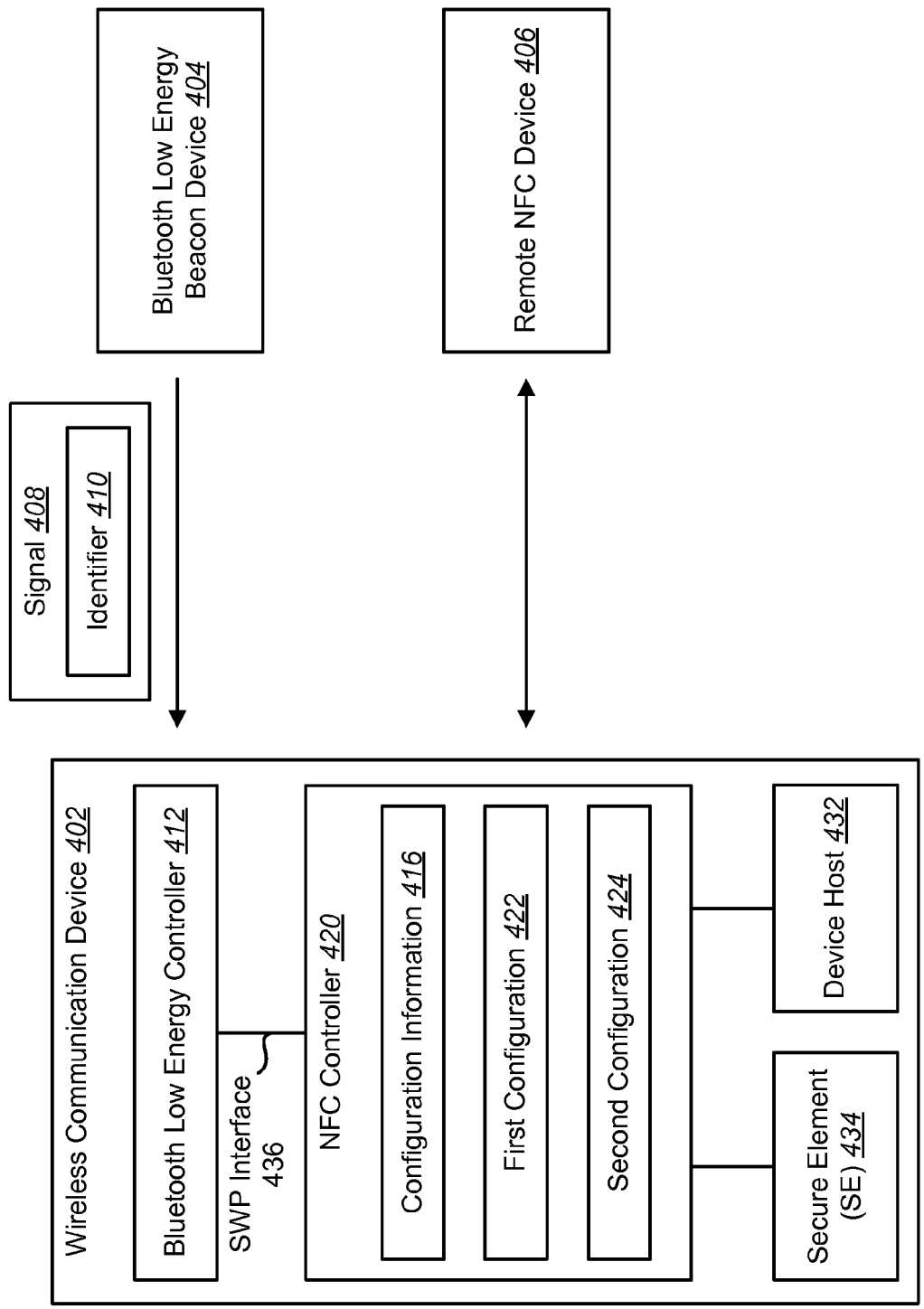
FIG. 4 is a block diagram illustrating a more specific configuration of a wireless communication device in which systems and methods for wireless communication interoperability may be implemented.

FIG. 4 is a block diagram illustrating a more specific configuration of a wireless communication device 402 in which systems and methods for wireless communication interoperability may be implemented. In particular, the wireless communication device 402 described in connection with FIG. 4 is a more specific example of the wireless communication device 102 described in connection with FIG. 1. Accordingly, the components included within the wireless communication device 402 described in connection with FIG. 4 may be examples of corresponding components described in connection with FIG. 1.

The wireless communication device 402 may include one or more of a Bluetooth low energy controller 412, an NFC controller 420, a device host 432 and a secure element (SE) 434. The Bluetooth low energy controller 412 may communicate with a Bluetooth low energy device using Bluetooth low energy protocols. The NFC controller 420 may communicate with NFC devices using NFC protocols.

The device host 432 may generally perform operations on the wireless communication device 402. One example of the device host 432 includes a processor and memory, where the processor runs an operating system (OS). Examples of operating systems that may be run by the device host 432 include Android, iOS, Windows Phone, Windows RT and Blackberry. The device host 432 may also be referred to as an application processor or apps processor.

In the context of NFC, there are two devices communicating: an initiator and a target. The antenna of an initiator NFC device produces a radiated field (also referred to as a magnetic field or an electromagnetic field) that is received by the antenna of a target NFC device. The communication range of NFC is limited to a few centimeters.

The initiator NFC device may have a transmitter and a receiver. The target NFC device may also have a transmitter and a receiver. The initiator NFC device may also be referred to as a poller, polling device or initiator. The target NFC device may also be referred to as a listener, listening device or target.

The initiator NFC device and the target NFC device may use one or more NFC signaling technologies to communicate with each other. The NFC signaling technologies may include NFC type-A, NFC type-B and NFC type-F. The NFC signaling technologies differ in the modulation schemes employed.

NFC has four different tag types, which support a subset of the NFC signaling technologies. Type 1 tags (T1T) use NFC type-A communication without data collision protection. Type 2 tags (T2T) use NFC type-B communication with anti-collision. Type 3 tags (T3T) use NFC type-F with anti-collision. Type 4 tags (T4T) can use either NFC type-A (T4AT) or NFC type-B (T4BT) with anti-collision.

In one implementation, the initiator NFC device and the target NFC device may be operable to communicate using NFC through various interfaces, such as a frame radio frequency (RF) interface, ISO-data exchange protocol (DEP) RF interface and NFC-DEP RF interface. In another implementation, the initiator NFC device and the target NFC device may establish an NFC-DEP RF protocol-based communication link with link layer connections defined through a logical link control protocol (LLCP). In still another implementation, the initiator NFC device and the target NFC device may be operable to be connected to an access network and/or core network (e.g., a CDMA network, a GPRS network, a UMTS network, and other types of wireline and wireless communication networks).

The initiator NFC device may generate an RF field to communicate with the target NFC device. The initiator NFC device may modulate the RF field to send a signal (e.g., data) to the target NFC device. Once the target NFC device receives that signal, the initiator NFC device may transmit a continuous wave to maintain the RF field. The continuous wave may have a carrier frequency. In the case of NFC, the carrier frequency may be 13.56 megahertz (MHz).

The target NFC device may receive the RF field. The target NFC device may respond by performing modulation on top of the continuous wave. The initiator NFC device may receive the modulated signal and may try to decode it.

In one exemplary configuration, the remote NFC device 406 may be an NFC reader. In this implementation, the remote NFC device 406 acts as an initiator NFC device and the wireless communication device 402 acts as a target NFC device. The remote NFC device 406 (i.e., the initiator NFC device) may poll for nearby NFC devices. The wireless communication device 402 (i.e., the target NFC device) may begin to listen when it comes within a few centimeters of the remote NFC device 406 (i.e., initiator NFC device). For example, a user may place wireless communication device 402 in the vicinity of the remote NFC device 406 to initiate a payment transaction. The remote NFC device 406 will then attempt to communicate with the wireless communication device 402 in order to determine which signaling technologies can be used.

In a low power implementation, the Bluetooth low energy controller 412 on the wireless communication device 402 may have a direct connection to the NFC controller 420. In one implementation, a single wire protocol (SWP) interface 436 may be used to couple the Bluetooth low energy controller 412 to the NFC controller 420. Alternatively, another type of serial connection or method of direct connection known in the art could be used to couple the Bluetooth low energy controller 412 to the NFC controller 420.

As used herein, the term "coupled" and variations thereof may mean that two or more components are directly or indirectly connected. For example, the Bluetooth low energy controller 412 may be directly connected to the NFC controller 420 (without any intervening components) or may be indirectly connected to the NFC controller 420 (via one or more intervening components). In the block diagrams included herein, lines or arrows between components may denote couplings.

The SWP interface 436 may simplify the connection between the Bluetooth low energy controller 412 and a secure element 434. A secure element 434 may be implemented in hardware or a combination of hardware and software. Each of the secure element(s) 434 may be, for example, an electronic circuit, a system on a chip (SoC), an ASIC, a microprocessor with instructions and/or a subscriber identity module (SIM) card, etc. One or more of the secure elements 434 may be removable from the wireless communication device 402. Additionally or alternatively, one or more of the secure elements 434 may be attached (e.g., soldered) and non-removable from the wireless communication device 402. One or more of the secure elements 434 may be operable independent of the device host 432. For example, the secure element(s) 434 may be capable of operating even while the device host 432 (e.g., the OS) is inactive. One example of a secure element 434 is a Universal Integrated Circuit Card (UICC)).

The Bluetooth low energy controller 412 of the wireless communication device 402 may receive a signal 408 that is broadcast from a Bluetooth low energy beacon 404. The Bluetooth low energy beacon 404 may be located on or near the remote NFC device 406.

The signal 408 may indicate proximity and characteristics of the remote NFC device 406. The signal 408 may include an identifier 410 that identifies characteristics of the remote NFC device 406. The identifier 410 may be used to identify the remote NFC device 406. This identifier 410 may be a Bluetooth low energy unique identifier (UID) 410.

The identifier 410 may identify the remote NFC device 406 and provide additional configuration parameters for how to reconfigure the NFC controller 420. The wireless communication device 402 may determine configuration information 416 for the second communication technology based on the signal 408. For example, the identifier 410 may indicate that the remote NFC device 406 is a transit reader, the size of the antenna used by the remote NFC device 406 and specific RF parameters that are preferred by the remote NFC device 406. This configuration information 416 may be encoded in the identifier 410 in a manner that can be decoded by the wireless communication device 402.

Upon receiving the signal 408 from the Bluetooth low energy beacon 404, the Bluetooth low energy controller 412 may provide the signal 408 to the NFC controller 420 over the SWP interface 436. The NFC controller 420 may decode the identifier 410 to determine the configuration information 416 for the remote NFC device 406. In one implementation, the configuration information 416 may be encoded in the identifier 410. In another implementation, the configuration information 416 may be stored in a database on the wireless communication device 402.

The NFC controller 420 may determine that a first configuration 422 used by the NFC controller 420 is incompatible with the remote NFC device 406. The NFC controller 420 may determine a second configuration 424 for the controller 420 that is interoperable with the remote NFC device 406 based on the configuration information 416.

The NFC controller 420 may apply the second configuration 424. For example, the NFC controller 420 may configure itself by changing one or more RF parameters. The NFC controller 420 may then establish a communications link with the remote NFC device 406 using the second configuration 424. Upon leaving the range of the Bluetooth low energy beacon 404, the NFC controller 420 may return to the first configuration 422.

In this implementation, the wireless communication device 402 may avoid powering-up the device host 432 when performing a transaction with the remote NFC device 406. Because the device host 432 may require more energy than the NFC controller 420, it may be beneficial to conduct a transaction with the remote NFC device 406 without powering up the device host 432. NFC controller interface (NCI) parameter merging may allow the NFC controller 420 to change RF parameters. Therefore, the NFC controller 420 may change its own RF parameters without interacting with the device host 432.

Figure 5:
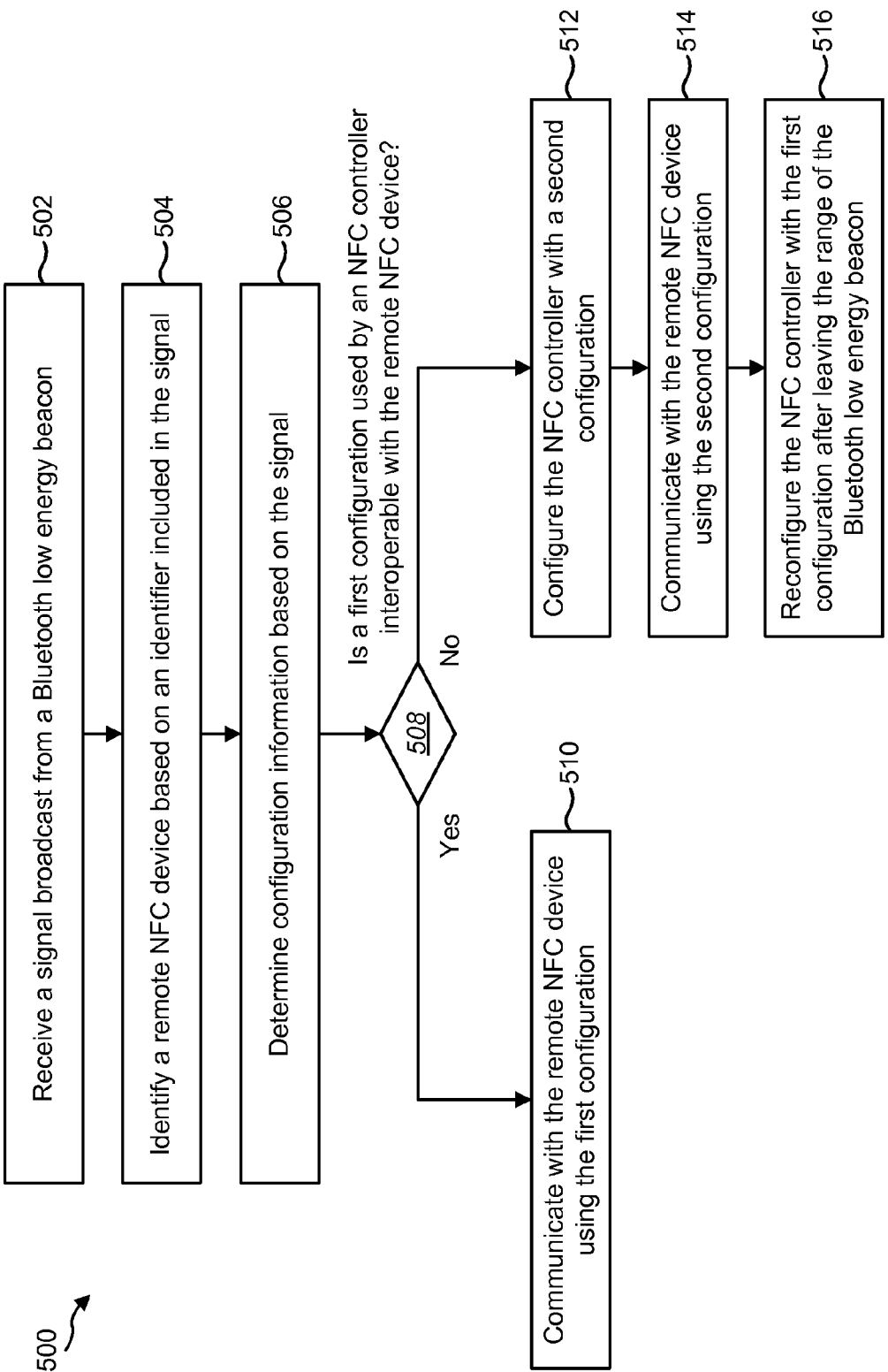
FIG. 5 is a flow diagram illustrating another implementation of a method for wireless communication interoperability.

FIG. 5 is a flow diagram illustrating another implementation of a method 500 for wireless communication interoperability. The method 500 may be implemented by a wireless communication device 402. The wireless communication device 402 may include a Bluetooth low energy controller 412 and an NFC controller 420. The wireless communication device 402 may receive 502 a signal 408 broadcast from a Bluetooth low energy beacon 404. The signal 408 may indicate proximity and characteristics of the remote NFC device 406.

The wireless communication device 402 may identify 504 a remote NFC device 406 based on an identifier 410 included in the signal 408. The identifier 410 may identify the remote NFC device 406 that is in close proximity to the Bluetooth low energy beacon 404.

The wireless communication device 402 may determine 506 configuration information 416 based on the signal 408. The identifier 410 included in the signal 408 may provide configuration parameters for how to reconfigure an NFC controller 420 of the wireless communication device 402 to communicate with the remote NFC device 406. For example, the identifier 410 may indicate that the remote NFC device 406 is a transit reader, the size of the antenna used by the remote NFC device 406 and specific RF parameters that are preferred by the remote NFC device 406. In one implementation, this configuration information 416 may be encoded in the identifier 410 in a manner that can be decoded by the wireless communication device 402. In another implementation, the configuration information 416 may be obtained from a database on the wireless communication device 402.

The wireless communication device 402 may determine 508 whether a first configuration 422 (e.g., default configuration) used by the NFC controller 420 is interoperable with the remote NFC device 406. If the identifier 410 indicates that the first configuration 422 of the NFC controller 420 is interoperable with the remote NFC device 406, the wireless communication device 402 may communicate 510 with the remote NFC device 406 using the first configuration 422.

If the wireless communication device 402 determines 508 that the first configuration 422 of the NFC controller 420 is not interoperable with the remote NFC device 406, the wireless communication device 402 may configure 512 the NFC controller 420 with a second configuration 424. The wireless communication device 402 may configure 512 the NFC controller 420 by changing one or more RF parameters of the NFC controller 420, as indicated by the configuration information 416 obtained from the signal 408. The wireless communication device 402 may then communicate 514 with the remote NFC device 406 using the second configuration 424.

Upon leaving the range of the Bluetooth low energy beacon 404, the wireless communication device 402 may reconfigure 516 the NFC controller 420 with the first configuration 422. It should be noted, that the reconfiguration 516 back to the first configuration 422 may occur regardless of whether communications with the remote NFC device 406 are successful.

Figure 6:
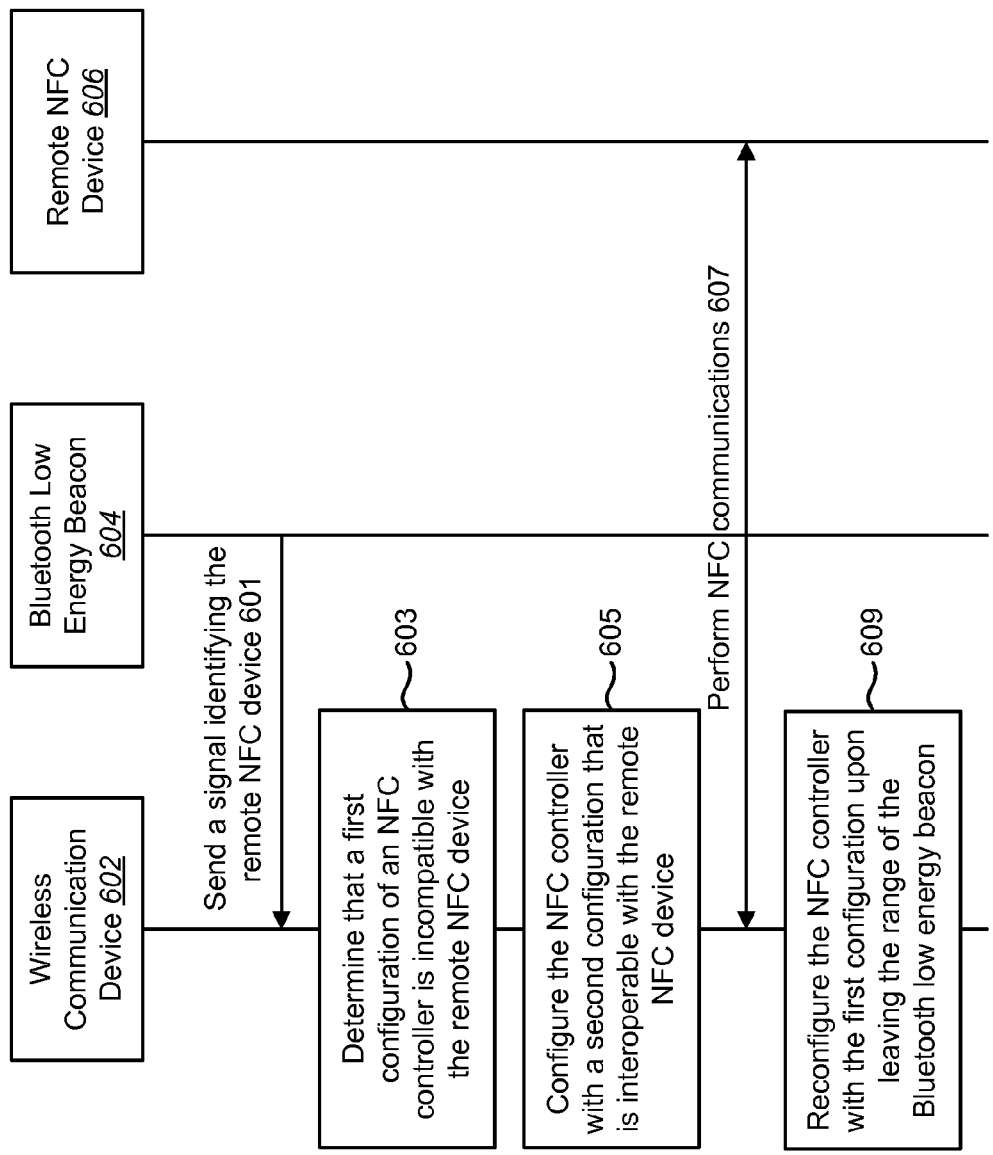
FIG. 6 is a sequence diagram illustrating a procedure for wireless communication interoperability.

FIG. 6 is a sequence diagram illustrating a procedure for wireless communication interoperability. A Bluetooth low energy beacon 604 may send 601 a signal 408 identifying a remote NFC device 606. The Bluetooth low energy beacon 604 may be in close proximity to the remote NFC device 606. The signal 408 may be broadcast from the Bluetooth low energy beacon 604. The signal 408 may include an identifier 410 (e.g., Bluetooth low energy UID) that identifies the remote NFC device 406.

Upon entering the range of the Bluetooth low energy beacon 604, the wireless communication device 602 may receive the signal 408. For example, a Bluetooth low energy controller 412 of the wireless communication device 602 may receive the signal 408.

The wireless communication device 602 may determine 603 that a first configuration 422 of an NFC controller 420 of the wireless communication device 602 is incompatible with the remote NFC device 606. For example, the wireless communication device 602 may determine configuration information 416 based on the signal 408. In one implementation, the identifier 410 included in the signal 408 may provide additional configuration parameters for how to reconfigure an NFC controller 420 of the wireless communication device 402 to communicate with the remote NFC device 406. The wireless communication device 602 may determine that the first configuration 422 is incompatible with the remote NFC device 606 based on the configuration information 416 obtained from the signal 408.

The wireless communication device 602 may configure 605 the NFC controller 420 with a second configuration 424 that is interoperable with the remote NFC device 606. For example, the wireless communication device 602 may change the RF parameters of the NFC controller 420 as indicated by the configuration information 416 obtained from the signal 408.

The wireless communication device 602 and the remote NFC device 606 may perform 607 NFC communications using the second configuration 424. Upon leaving the range of the Bluetooth low energy beacon 604, the wireless communication device 602 may reconfigure 609 the NFC controller 420 with the first configuration 422.

Figure 7:
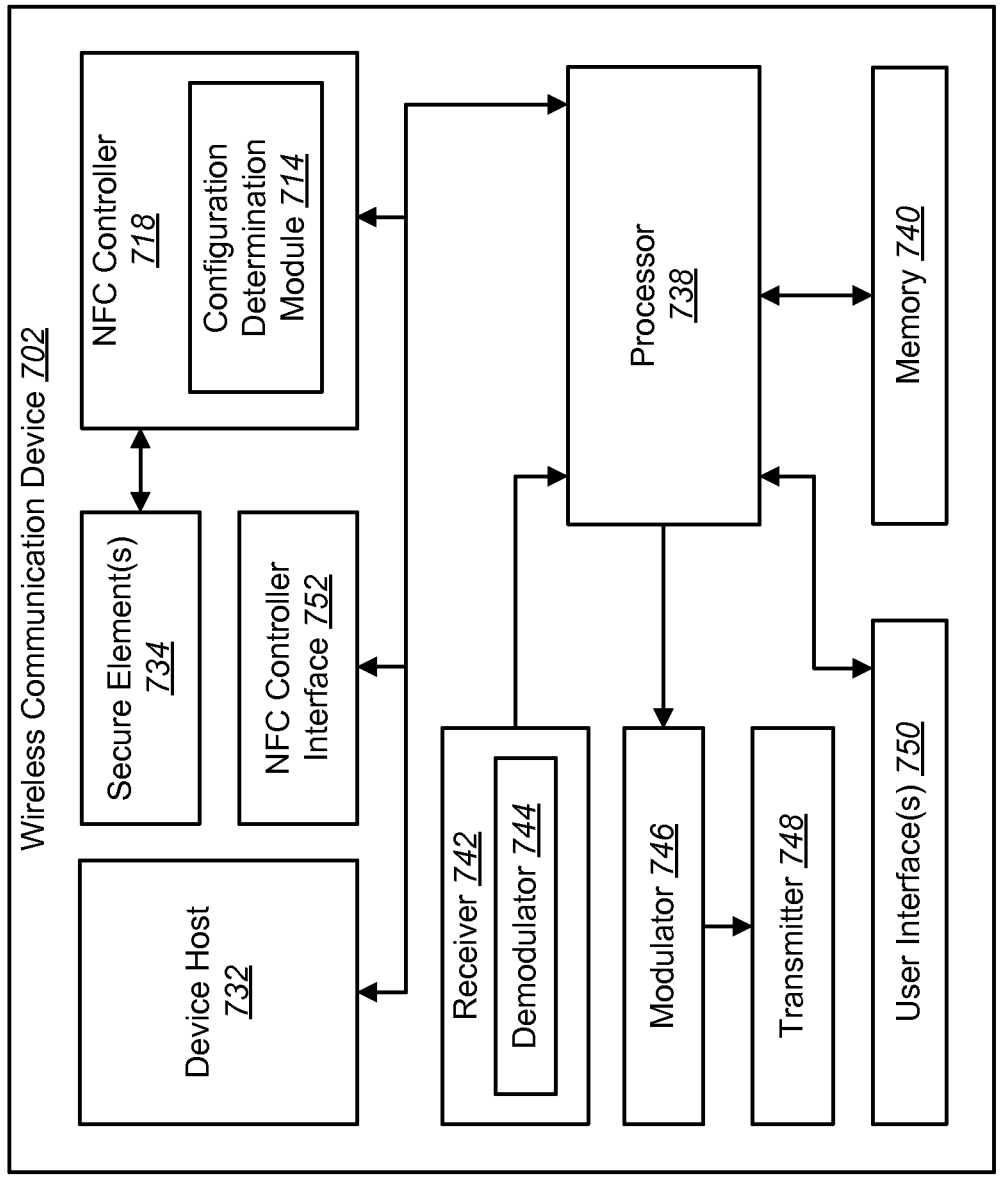
FIG. 7 is a block diagram illustrating another more specific configuration of a wireless communication device in which systems and methods for wireless communication interoperability may be implemented.

FIG. 7 is a block diagram illustrating another more specific configuration of a wireless communication device 702 in which systems and methods for wireless communication interoperability may be implemented. The components included within the wireless communication device 702 may be examples of corresponding components described above in connection with one or more of FIGS. 1, 3, 4 and 6.

As depicted in FIG. 7, the wireless communication device 702 includes a receiver 742 that receives a signal from, for instance, a receive antenna (not shown), performs typical actions on (e.g., filters, amplifies, downconverts, etc.) the received signal, and digitizes the conditioned signal to obtain samples. The receiver 742 can comprise a demodulator 744 that can demodulate received symbols and provide them to a processor 738 for channel estimation.

The processor 738 can be a processor dedicated to analyzing information received by the receiver 742 and/or generating information for transmission by the transmitter 748, a processor that controls one or more components of the wireless communication device 702, and/or a processor that analyzes information received by the receiver 742, generates information for transmission by the transmitter 748 and controls one or more components of the wireless communication device 702. Further, signals may be prepared for transmission by the transmitter 748 through the modulator 746, which may modulate the signals processed by the processor 738.

The wireless communication device 702 can additionally comprise memory 740 that is operatively coupled to the processor 738 and that can store data to be transmitted, received data, information related to available channels, transmission control protocol (TCP) flows, data associated with analyzed signal and/or interference strength, information related to an assigned channel, power, rate or the like, and any other suitable information for estimating a channel and communicating via the channel.

Further, the processor 738, receiver 742, transmitter 748, NFC controller 718, and/or the device host 732 may perform one or more of the functions described above in connection with FIGS. 1-6. It will be appreciated that the data store (e.g., memory 740) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 740 of the subject systems and methods may comprise, without being limited to, these and any other suitable types of memory.

In another aspect, the wireless communication device 702 may include an NFC controller interface (NCI) 752. In an aspect, the NCI 752 may be operable to enable communications between the device host 732 and the NFC controller 718.

The wireless communication device 702 may include an NFC controller 718. The NFC controller 718 may include a configuration determination module 714. The NFC controller 718 may communicate with one or more secure elements 734.

In an aspect, the NFC controller 718 may be operable to obtain, through the NCI 752, information from other devices, such as a remote NFC device 406. During ISO-DEP communication, the NFC controller 718 may operate using a frame RF interface or an ISO-DEP interface. When operating using the ISO-DEP interface, the NFC controller 718 may be operable to change various parameters associated with communications between the device host 732 and the remote NFC device 406 using a data exchange change module.

In some configurations, the NFC controller 718 may act as a relay and communicate messages between the device host 732 and a remote NFC device 406. For example, the device host 732 may extract data from messages exchanged with the remote NFC device 406. Communications may prompt the NFC controller 718 to change various data. The NFC controller 718 may update received parameters and/or may store parameters in memory.

Additionally, the wireless communication device 702 may include one or more user interfaces 750. The user interface (s) 750 may include input mechanism(s) for generating inputs into the wireless communication device 702 and/or output mechanism(s) for generating information for consumption by the user of the wireless communication device 702. For example, input mechanism(s) may include a mechanism such as a key or keyboard, a mouse, a touchscreen display, a microphone, etc. Further, for example, output mechanism(s) may include a display, an audio speaker, a haptic feedback mechanism, a Personal Area Network (PAN) transceiver etc. In the illustrated aspects, the output mechanism may include a display operable to present media content that is in image or video format or an audio speaker to present media content that is in an audio format.

Figure 8:
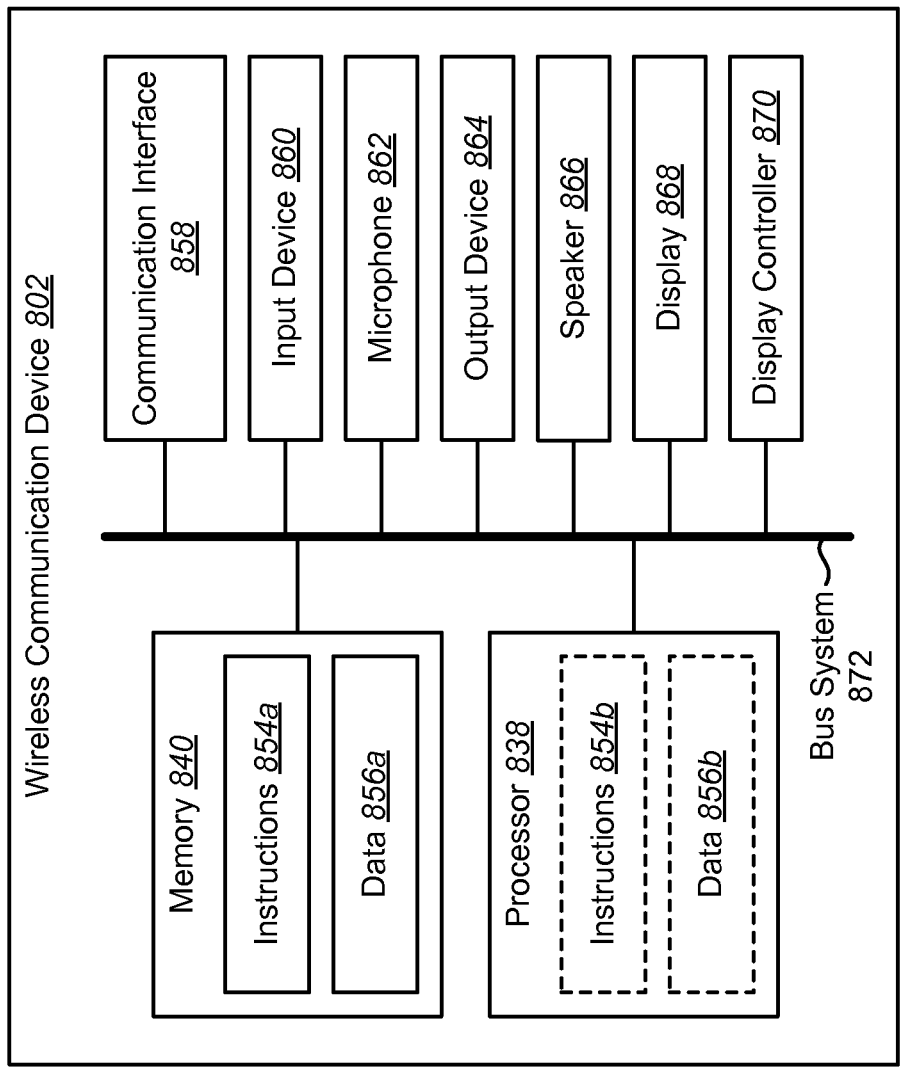
FIG. 8 illustrates various components that may be utilized in a wireless communication device.

FIG. 8 illustrates various components that may be utilized in a wireless communication device 802. The illustrated components may be located within the same physical structure or in separate housings or structures. The wireless communication device 802 described in connection with FIG. 8 may be implemented in accordance with one or more of the wireless communication devices 102, 302, 402, 602, 702 described herein.

The wireless communication device 802 includes a processor 838. The processor 838 may be a general purpose single- or multi-chip microprocessor (e.g., an ARM), a special purpose microprocessor (e.g., a digital signal processor (DSP)), a microcontroller, a programmable gate array, etc. The processor 838 may be referred to as a central processing unit (CPU). Although just a single processor 838 is shown in the wireless communication device 802 of FIG. 8, in an alternative configuration, a combination of processors 838 (e.g., an ARM and DSP) could be used.

The wireless communication device 802 also includes memory 840 in electronic communication with the processor 838. That is, the processor 838 can read information from and/or write information to the memory 840. The memory 840 may be any electronic component capable of storing electronic information. The memory 840 may be random access memory (RAM), read-only memory (ROM), magnetic disk storage media, optical storage media, flash memory devices in RAM, on-board memory included with the processor 838, programmable read-only memory (PROM), erasable programmable read-only memory (EPROM), electrically erasable PROM (EEPROM), registers, and so forth, including combinations thereof.

Instructions 854a and data 856a may be stored in the memory 840. The instructions 854a may include one or more programs, routines, sub-routines, functions, procedures, etc. The instructions 854a may include a single computer-readable statement or many computer-readable statements. The instructions 854a may be executable by the processor 838 to implement one or more of the methods, functions and procedures described above. Executing the instructions 854a may involve the use of the data 856a that is stored in the memory 840. FIG. 8 shows some instructions 854b and data 856b being loaded into the processor 838 (which may come from instructions 854a and data 856a that are stored in the memory 840).

The wireless communication device 802 may also include one or more communication interfaces 858 for communicating with other electronic devices. The communication interfaces 858 may be based on wired communication technology, wireless communication technology or both. Examples of different types of communication interfaces 858 include a serial port, a parallel port, a Universal Serial Bus (USB), an Ethernet adapter, an Institute of Electrical and Electronics Engineers (IEEE) 1394 bus interface, a near field communication (NFC) transceiver, a small computer system interface (SCSI) bus interface, an infrared (IR) communication port, a Bluetooth wireless communication adapter, a 3rd Generation Partnership Project (3GPP) transceiver, an IEEE 802.11 ("Wi-Fi") transceiver and so forth. For example, the communication interface 858 may be coupled to one or more antennas (not shown) for transmitting and receiving wireless signals.

The wireless communication device 802 may also include one or more input devices 860 and one or more output devices 864. Examples of different kinds of input devices 860 include a keyboard, mouse, microphone 862, remote control device, button, joystick, trackball, touchpad, lightpen, etc. For instance, the wireless communication device 802 may include one or more microphones 862 for capturing acoustic signals. In one implementation, a microphone 862 may be a transducer that converts acoustic signals (e.g., voice, speech) into electrical or electronic signals. Examples of different kinds of output devices 864 include a speaker 866, printer, etc. For instance, the wireless communication device 802 may include one or more speakers 866. In one implementation, a speaker 866 may be a transducer that converts electrical or electronic signals into acoustic signals. One specific type of output device 864 that may be typically included in a wireless communication device 802 is a display 868 device. Display 868 devices used with configurations disclosed herein may utilize any suitable image projection technology, such as a cathode ray tube (CRT), liquid crystal display (LCD), light-emitting diode (LED), gas plasma, electroluminescence, or the like. A display controller 870 may also be provided, for converting data stored in the memory 840 into text, graphics, and/or moving images (as appropriate) shown on the display 868 device.

The various components of the wireless communication device 802 may be coupled together by one or more buses, which may include a power bus, a control signal bus, a status signal bus, a data bus, etc. For simplicity, the various buses are illustrated in FIG. 8 as a bus system 872. It should be noted that FIG. 8 illustrates only one possible configuration of a wireless communication device 802. Various other architectures and components may be utilized.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

It should be noted that one or more of the features, functions, procedures, components, elements, structures, etc., described in connection with any one of the configurations described herein may be combined with one or more of the functions, procedures, components, elements, structures, etc., described in connection with any of the other configurations described herein, where compatible. In other words, any compatible combination of the functions, procedures, components, elements, etc., described herein may be implemented in accordance with the systems and methods disclosed herein.

The functions described herein may be stored as one or more instructions on a processor-readable or computer-readable medium. The term "computer-readable medium" refers to any available medium that can be accessed by a computer or processor. By way of example, and not limitation, such a medium may comprise Random-Access Memory (RAM), Read-Only Memory (ROM), Electrically Erasable Programmable Read-Only Memory (EEPROM), flash memory, Compact Disc Read-Only Memory (CD-ROM) or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for wireless communication, comprising:
   receiving a signal from a short-range transmit device using a first communications technology, wherein the signal indicates proximity and characteristics of a remote device that uses an induction-based communications technology, and wherein the characteristics of the remote device comprise at least one of an antenna size or a preferred radio frequency (RF) parameter;
   determining, based on the signal, that a first configuration used by a controller for the induction-based communications technology is incompatible with the remote device; and configuring the controller, based on the signal, to use a second configuration for the induction-based communications technology that is interoperable with the remote device.

2. The method of claim 1, wherein the first communications technology has a longer range than the induction-based communications technology.

3. The method of claim 1, wherein the signal comprises an identifier that identifies the characteristics of the induction-based communications technology used by the remote device.

4. The method of claim 1, wherein the short-range transmit device is a Bluetooth low energy beacon and the remote device is a remote near-field communication (NFC) device.

5. The method of claim 1, further comprising determining configuration information for the induction-based communications technology based on the signal.

6. The method of claim 1, further comprising reconfiguring the controller with the first configuration upon leaving a transmission range of the short-range transmit device.

7. The method of claim 1, wherein configuring the controller comprises changing one or more radio frequency (RF) parameters of the controller.

8. The method of claim 1, wherein a Bluetooth low energy controller provides the signal to a device host, wherein the device host configures the controller according to the signal.

9. The method of claim 1, wherein a Bluetooth low energy controller is directly connected to the controller via a single wire protocol (SWP) interface, wherein configuring the controller for communications with the remote device occurs without powering up a device host.

10. The method of claim 1, wherein the remote device is a near-field communication (NFC) reader used in a mass transit system to implement ticketing transactions, wherein the second configuration that is interoperable with the NFC reader is applied to the controller in lieu of the first configuration.

11. A wireless communication device, comprising:
a processor;
memory in electronic communication with the processor; and
instructions stored in the memory, the instructions being executable by the processor to:
receive a signal from a short-range transmit device using a first communications technology, wherein the signal indicates proximity and characteristics of a remote device that uses an induction-based communications technology, and wherein the characteristics of the remote device comprise at least one of an antenna size or a preferred radio frequency (RF) parameter;
determine, based on the signal, that a first configuration used by a controller for the induction-based communications technology is incompatible with the remote device; and
configure the controller, based on the signal, to use a second configuration for the induction-based communications technology that is interoperable with the remote device.

12. The wireless communication device of claim 11, wherein the first communications technology has a longer range than the induction-based communications technology.

13. The wireless communication device of claim 11, wherein the signal comprises an identifier that identifies the characteristics of the induction-based communications technology used by the remote device.

14. The wireless communication device of claim 11, wherein the short-range transmit device is a Bluetooth low energy beacon and the remote device is a remote near-field communication (NFC) device.

15. The wireless communication device of claim 11, wherein the instructions executable to configure the controller comprise instructions executable to change one or more radio frequency (RF) parameters of the controller.

16. The wireless communication device of claim 11, wherein the remote device is a near-field communication (NFC) reader used in a mass transit system to implement ticketing transactions, wherein the second configuration that is interoperable with the NFC reader is applied to the controller in lieu of the first configuration.

17. A computer-program product for wireless communication, comprising a non-transitory tangible computer-readable medium having instructions thereon, the instructions comprising:
code for causing a wireless communication device to receive a signal from a short-range transmit device using a first communications technology, wherein the signal indicates proximity and characteristics of a remote device that uses an induction-based communications technology, and wherein the characteristics of the remote device comprise at least one of an antenna size or a preferred radio frequency (RF) parameter;
code for causing the wireless communication device to determine, based on the signal, that a first configuration used by a controller for the induction-based communications technology is incompatible with the remote device; and
code for causing the wireless communication device to configure the controller, based on the signal, to use a second configuration for the induction-based communications technology that is interoperable with the remote device.

18. The computer-program product of claim 17, wherein the first communications technology has a longer range than the induction-based communications technology.

19. The computer-program product of claim 17, wherein the signal comprises an identifier that identifies the characteristics of the induction-based communications technology used by the remote device.

20. The computer-program product of claim 17, wherein the short-range transmit device is a Bluetooth low energy beacon and the remote device is a remote near-field communication (NFC) device.

21. The computer-program product of claim 17, wherein the code for causing the wireless communication device to configure the controller comprises code for causing the wireless communication device to change one or more radio frequency (RF) parameters of the controller.

22. An apparatus for wireless communication, comprising:
means for receiving a signal from a short-range transmit device using a first communications technology, wherein the signal indicates proximity and characteristics of a remote device that uses an induction-based communications technology, and wherein the characteristics of the remote device comprise at least one of an antenna size or a preferred radio frequency (RF) parameter;
means for determining, based on the signal, that a first configuration used by a controller for the induction-based communications technology is incompatible with the remote device; and means for configuring the controller, based on the signal, to use a second configuration for the induction-based communications technology that is interoperable with the remote device.

23. The apparatus of claim 22, wherein the first communications technology has a longer range than the induction-based communications technology.

24. The apparatus of claim 22, wherein the signal comprises an identifier that identifies the characteristics of the induction-based communications technology used by the remote device.

25. The apparatus of claim 22, wherein the short-range transmit device is a Bluetooth low energy beacon and the remote device is a remote near-field communication (NFC) device.

26. The apparatus of claim 22, wherein the means for configuring the controller comprise means for changing one or more radio frequency (RF) parameters of the controller.

* * * * *